United States Patent
Maul et al.

(10) Patent No.: US 8,619,778 B2
(45) Date of Patent: Dec. 31, 2013

(54) METHOD FOR AUTOMATIC ADDRESS ALLOCATION TO A COMMUNICATION PARTNER AND A COMMUNICATION PARTNER

(75) Inventors: Jürgen Maul, Sulzbach-Rosenberg (DE); Albert Tretter, Pirk (DE)

(73) Assignee: Siemens Aktiengesellschaft, München (DE)

( * ) Notice: Subject to any disclaimer, the term of this patent is extended or adjusted under 35 U.S.C. 154(b) by 1889 days.

(21) Appl. No.: 11/880,147

(22) Filed: Jul. 20, 2007

(65) Prior Publication Data

US 2008/0037530 A1 Feb. 14, 2008

(30) Foreign Application Priority Data

Aug. 2, 2006 (EP) ..................................... 06016149

(51) Int. Cl.
*H04L 12/28* (2006.01)
(52) U.S. Cl.
USPC .............................. 370/392; 709/220; 709/245
(58) Field of Classification Search
USPC ........... 370/241.1, 351, 392, 397, 399, 395.3; 709/220, 221, 222, 238; 726/13; 373/89, 92
See application file for complete search history.

(56) References Cited

U.S. PATENT DOCUMENTS

| | | | |
|---|---|---|---|
| 6,405,247 B1 * | 6/2002 | Lawande et al. | 709/221 |
| 6,728,245 B1 * | 4/2004 | Nakatsugawa | 370/392 |
| 2004/0165534 A1 * | 8/2004 | Claseman | 370/241.1 |
| 2005/0047390 A1 * | 3/2005 | Park et al. | 370/351 |

FOREIGN PATENT DOCUMENTS

| | | |
|---|---|---|
| DE | 10048745 C1 | 2/2002 |
| EP | 0887980 A2 | 12/1998 |
| EP | 1032162 A2 | 8/2000 |

* cited by examiner

*Primary Examiner* — Hassan Phillips
*Assistant Examiner* — Ajay Cattungal

(57) ABSTRACT

There is described a method for automatic address allocation to at least one communication partner encompassed by a network, whereby a primary communication partner likewise encompassed by the network transfers a data item to the, or one of the, communication partner(s) and whereby the communication partner in question performs a comparison of the data item with a reference data item. Depending on the result of the comparison, either an address is assigned to the communication partner in question or the data item is transferred to a communication partner downstream of the communication partner in question in the network and the data item is modified in conjunction with the transfer of the data item to the downstream communication partner. There is also described a communication partner as well as an automation system for executing the method as well as an automation system with such a communication partner.

18 Claims, 2 Drawing Sheets

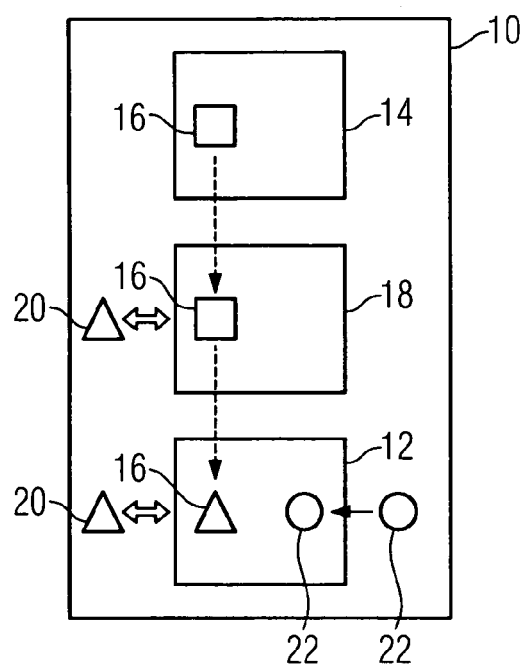
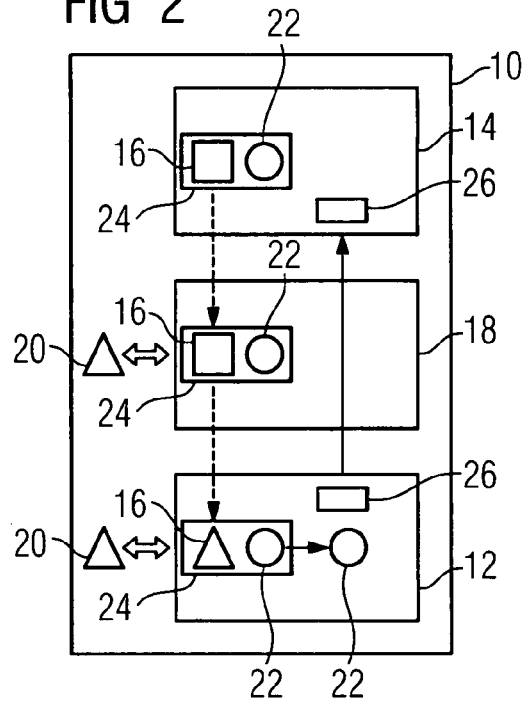
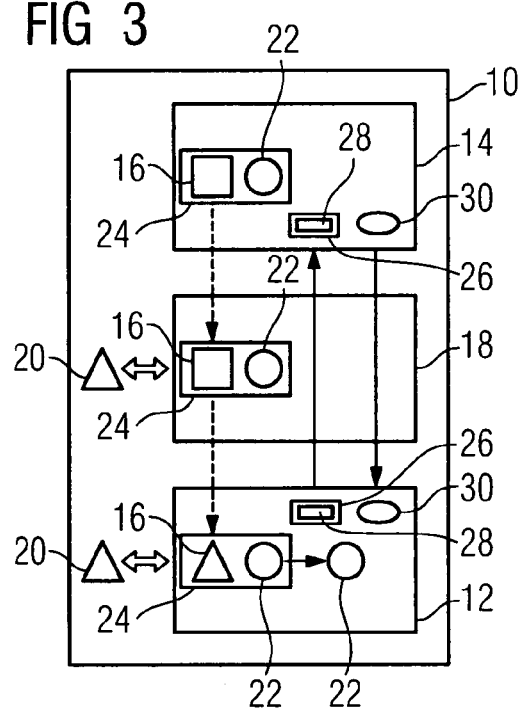

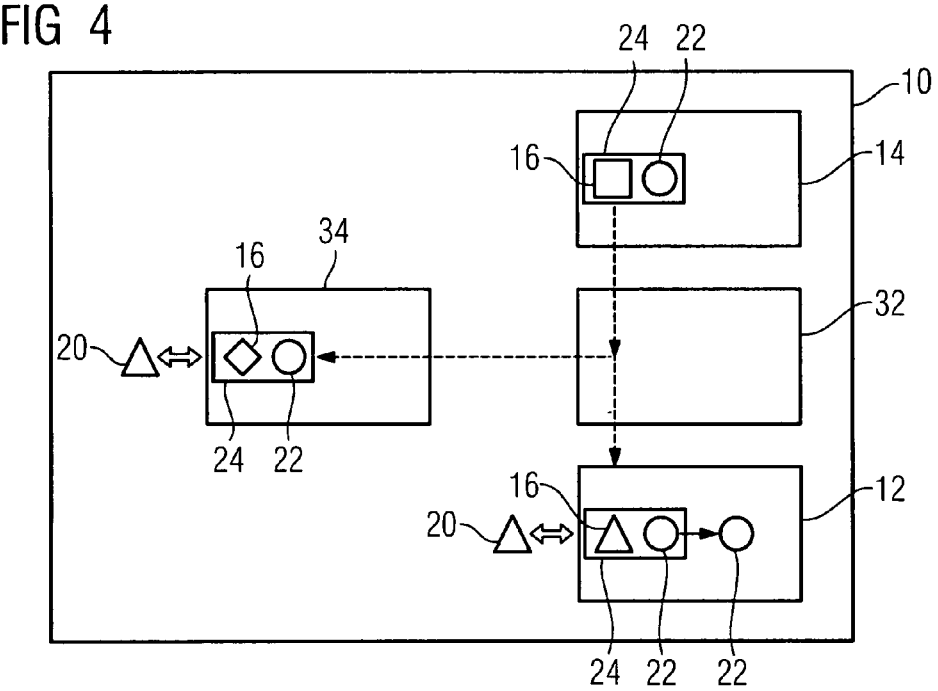
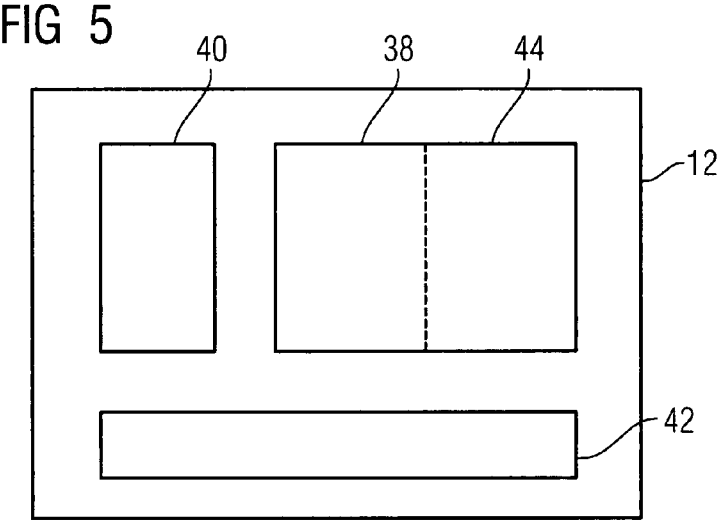

METHOD FOR AUTOMATIC ADDRESS ALLOCATION TO A COMMUNICATION PARTNER AND A COMMUNICATION PARTNER

CROSS REFERENCE TO RELATED APPLICATIONS

This application claims priority of European application No. 06016149.4 EP filed Aug. 2, 2006, which is incorporated by reference herein in its entirety.

FIELD OF INVENTION

The invention relates to a method for automatic address allocation to at least one communication partner encompassed by a network, whereby a primary communication partner likewise encompassed by the network transfers a data item to the, or one of the, communication partner(s) and whereby the communication partner in question performs a comparison of the data item with a reference data item. It also relates to a communication partner as well as an automation system for executing the method as well as an automation system with such a communication partner.

BACKGROUND OF THE INVENTION

Different methods for address allocation in communication systems are generally known.

For example, in the case of an Ethernet application a possibly globally unique MAC (Media Access Control) address is stored in remanent fashion in each Ethernet controller and is used for addressing purposes. It is difficult to ascertain a topology of a resulting network and this is done for example by means of an additional protocol, for example by means of the LLDP protocol (Link Layer Discovery Protocol), which is used to ascertain data concerning all linkage points of the network. MAC addresses are likewise stored in remanent fashion in the case of so-called field buses, notably the PROFIBUS, for example after setting by a user. With regard to ascertaining a topology, in this situation the problems outlined above result once again however. In the case of an alternative method, a Module Select control line is run to each plug-in location of a parallel backplane system. Since the addresses set up on the bus are only valid at the plug-in location or module when the Module Select control line is active, this results in restrictions with regard to the rack coupling and to ascertaining the topology.

SUMMARY OF INVENTION

An object of the invention is to set down a particularly suitable method for automatic address allocation to at least one communication partner encompassed by a network, whereby a primary communication partner similarly encompassed by the network transfers a data item to the, or one of the, communication partner(s) and whereby the communication partner in question carries out a comparison of the data item with a reference data item. To this end, provision is made whereby depending on the result of the comparison either an address is assigned to the communication partner in question or the data item is transferred to a communication partner downstream of the communication partner in question in the network and the data item is modified in conjunction with the transfer of the data item to the downstream communication partner.

Furthermore, a communication partner particularly suited to executing the method having a receiver facility for receiving a data item and a comparator for comparing the data item with a reference data item is to be set down. Provision is made in this respect whereby the communication partner includes a processing unit which is provided for assigning an address to the communication partner and for transferring the data item to a sender facility of the communication partner depending on the result of the comparison in each case, and whereby the processing unit is provided for modifying the data item in conjunction with the transfer of the data item to the sender facility. Moreover, a computer program is specified with program code statements capable of execution by a computer for implementing the method as well as embodiments described in the following when the computer program is run on a computer, and a computer software product, particularly a storage medium with such a type of computer program capable of execution by a computer. Furthermore, an automation system with program code means for executing such a method and also an automation system with at least one communication partner according to the invention and a primary communication partner are specified. In this situation, on the side of the primary communication partner a processing unit is provided for transferring a data record comprising a data item and an address to one of the communication partners which is capable of being connected communicatively either directly or indirectly, namely by way of a communicative connection to one or more other communication partners, to the primary communication partner.

Advantageous developments of the independent claims are the subject matter of the subclaims. Related references used in subclaims refer to the further implementation of the subject matter of the main claim through the features of the respective subclaim; they are not to be regarded as abandoning the attainment of an independent, concrete protection for the feature combinations of the related subclaims. Furthermore, in respect of an interpretation of the claims in the case of a more detailed concretization of a feature in a subsequent claim it should be assumed that such a type of restriction is not present in the preceding claims in each case.

In one embodiment the primary communication partner, which acts for example as a master in the network, transfers a data record comprising the data item and the address to the, or one of the, communication partner(s), which enables a simultaneous transfer of the data item and the address. In this situation, at least one address or the data record can be stored or can be capable of being stored in a database, to which for example the primary communication partner has access. The primary communication partner can for example transfer the data record stored in the database or can create the data record to be transferred from the stored address and at least one data item, in conjunction with the transfer if applicable. The primary communication partner can either transfer the data record itself or cause another communication partner to initiate the transfer. For this purpose, a transfer of an initiation telegram is for example provided which exclusively or non-exclusively comprises the address, the data record or for example a signal for creation of the data record by the, or another, communication partner.

In a preferred embodiment, the modification of the data item consists in incrementing or decrementing it according to a predefined or predefinable step size, particularly a step size of "one". To this end, electronic components, signal generators, or computer implementable mathematical or logical algorithms or operations are provided, for example. The step size can be variable or capable of being varied, whereby a variation can for example be effected manually or in automated fashion, on the basis of at least one stored or storable rule. By this means it becomes possible to adapt the modification of the data item for example to requirements for different communication systems, for example a number of communication partners, or different reference data.

By particular preference, the incrementation or decrementation is effected by a communication partner to which an address is to be assigned by means of automatic address allocation. A simple address allocation in a communication system having a chain-like structure is brought about by this means because the data item is incremented or decremented in conjunction with each transfer of the data item from an upstream communication partner to a downstream communication partner. Communication partners which perform an incrementation or decrementation are for example those communication partners which function as a slave or "hub" in the network. In this situation and in the following a hub is considered to be a communication partner with a number of ports, by means of which other communication partners can be connected to the hub serving as a distributor. If a plurality of communication partners are connected by way of a hub and a data item is transferred to the latter, then the hub transfers the incremented or decremented data item to each communication partner connected to it. In this situation, an incrementation or decrementation of the data item occurs successively in conjunction with each transfer of the data item, in other words the hub increments or decrements the data item for each communication partner connected to it and if necessary it does this more than once, depending on a port number or a number of communication partners connected to the hub. In addition or alternatively, at least one subdata item can be associated with the data item. In this situation, an evaluation of the subdata item by subsequent communication partners occurs exactly in the same way as the evaluation of the data item described previously. A recursive application, as it were, of the approach according to the invention thus also results for partial networks based on a hub.

If the network has a mixed chain- and star-shaped structure, the data item is for example initially modified in conjunction with a transfer of the data item and the subdata item from a hub to a communication partner connected to a port on the hub. Subsequently, the subdata item is then modified, for example incremented or decremented, by the communication partner for example, in conjunction with the transfer of the data item and the subdata item to at least one communication partner connected to the hub or downstream communication partners, and henceforth, where previously the data item was compared with the reference data item, the subdata item is compared with the reference data item. With regard to the downstream communication partners, these can in turn be at least one slave or hub, for example. In the case of a further hub, an again recursive application of the address assignment preformed by the method occurs, whereby the subdata item is henceforth supplemented by a further subdata item. By this means, the address allocation to all communication partners can take place in a simple manner in a communication system, for example having a star-shaped structure or mixed star- and chain-shaped structure.

In a preferred embodiment, particularly in conjunction with the assignment of the address to the respective communication partner, a response is transferred by the latter to a communication partner, particularly the primary communication partner, provided for processing the response. The primary communication partner can either store the transferred response itself, for example in a database assigned to it, or forward it to another communication partner provided for the purpose, which for its part can store the response in a database. Both the primary communication partner and also the other communication partner can be provided for the purpose of processing the response in order to ascertain from the latter, in combination with responses received from other communication partners where applicable, information regarding a network topology, in other words a spatial arrangement of the communication partners in the network. If in the case of automatic address allocation by the primary communication partner only one data record is ever transferred in each case, it is possible on the basis of a subsequently transferred response from the one communication partner to which the address has been assigned to easily ascertain the spatial arrangement of the communication partners on the basis of the originally transferred data, in other words the data record, in particular the data item. Alternatively, provision can be made whereby the primary communication partner transfers two or more data records. Then, for example, a response containing additional information relating to the identification of the data item originally transferred to this communication partner for the purpose of address allocation is transferred from the communication partner to which the address has been assigned to the primary communication partner. The thereby guaranteed capability to assign the response to the originally transferred data item thus in turn makes it possible to easily ascertain the topology.

By particular preference, at least one attribute data item assigned to the respective communication partner, particularly a topology data item, is transferred with the or each response. If a topology of the network is ascertained on the basis of the attribute data item by the communication partner, particularly the primary communication partner, provided for processing the response, this can for example be stored by the primary communication partner in a database. The topology of the network can then be evaluated, for example with regard to an accessibility or activity of a communication partner. Further facilities for evaluating the topology consist in recognizing alternative communicative connections between communication partners, recognizing an interconnection of certain communication partners, recognizing an interconnection of racks, in other words of holding devices for communication partners, or ascertaining general information with regard to the interconnection or the communicative connection of communication partners or racks.

If the ascertained topology of the network is evaluated by the primary communication partner in order to perform an addressing of at least one telegram to be transferred on the basis of a result of the evaluation, addressing types are viable which previously could either not be implemented or could only be implemented with disproportionately high effort. For example, telegrams to all communication partners in a particular bus segment or telegrams to all communication partners which follow a particular communication partner are possible.

With regard to a preferred embodiment of the communication partner, its processing unit includes means for modifying the data item. In this case, electronic components such as signal generators or computer implementable mathematical or logical algorithms or operations for incrementing or decrementing the data item according to a predefined or predefinable step size can be considered as means for modifying the data item.

By particular preference, the processing unit is provided for transferring a response to the sending unit. In this situation, the transfer of the response preferably takes place in conjunction with the assignment of the address, whereby "in conjunction" here means before, during or after the assignment of the address. The response can for example be transferred in the form of a response telegram. This is stored for example prior to the transfer, in a database for example, or is generated in conjunction with the transfer. In this situation, the response can for example be identical or similar in content to the data item or to a data record comprising at least the data item. Alternatively or in addition, the response can for example comprise information in respect of one or more attributes of the communication partner, such as for example at least a topology data item, a serial number for the communication partner, a software version number, a port count or information in respect of a linkage with communication partners on a following rack.

The aforementioned object is furthermore also achieved by an automation system having means, particularly program code means, for executing the described method or its embodiments. Finally, the object is also achieved by an automation system having at least one communication partner of the type described above or in the following as well as a primary communication partner with a processing unit. In this situation, the processing unit of the primary communication partner is provided for transferring a data record comprising a data item and an address to one of the communication partners which is capable of being connected communicatively either directly or indirectly, namely by way of a communicative connection to one or more other communication partners, to the primary communication partner.

The claims filed with the application are proposed formulations without prejudice to the achievement of more extensive patent protection. The applicant reserves the right to claim further combinations of features hitherto only disclosed in the description and/or drawing.

The or each exemplary embodiment must not be understood as a restriction of the invention. Rather, numerous alterations and modifications are possible in the context of the present disclosure, in particular such variants, elements and combinations which for example the person skilled in the art is taught with regard to the solution of the problem by a combination or restatement of individual features or elements or method steps described in the general or special description section and contained in the claims and/or the drawing and which because features can be combined result in a new subject matter or new method steps or sequences of method steps.

BRIEF DESCRIPTION OF THE DRAWINGS

An embodiment of the invention will be described in detail in the following with reference to the drawings. Corresponding objects or elements are identified by the same reference characters in all the figures.

In the drawings:

FIG. 1 shows a schematically simplified representation of a method according to the invention relating to automatic address allocation.

FIG. 2 shows a schematic representation of an embodiment of the method relating to automatic address allocation.

FIG. 3 shows a schematic representation of a further embodiment of the method relating to automatic address allocation.

FIG. 4 shows a schematic representation of an alternative method relating to automatic address allocation.

FIG. 5 shows a schematic representation of a communication partner.

DETAILED DESCRIPTION OF INVENTION

FIG. 1 shows a schematically simplified representation in order to explain the inventive method for automatic address allocation to a communication partner 12 encompassed by a network 10. For the purpose of address allocation, a primary communication partner 14 likewise encompassed by the network 10 transfers a data item 16 to a first communication partner 18 and this first communication partner 18 performs a comparison of the data item 16 with a reference data item 20. If there is a mismatch between the transferred data item 16 and the reference data item 20, the data item 16 is transferred to a communication partner 12 downstream of the first communication partner 18 in the network 10. In conjunction with the transfer of the data item 16, in other words before, during or after the transfer to the downstream communication partner 12, the data item 16 is modified by the first communication partner 18 or the downstream communication partner 12. The downstream communication partner 12 now for its part performs a comparison of the data item 16 with the reference data item 20 and if the data item 16 is found to match the reference data item 20 an address 22, which for example is transferred by the primary communication partner 14 to the communication partner 12, is assigned to the communication partner 12.

FIG. 2 shows a schematic representation of an embodiment of the method relating to automatic address allocation, which corresponds in its main features to that described in FIG. 1. In this situation, a data record 24 encompassing the data item 16 and the address 22 is however transferred in each case from the primary communication partner 14 to the first and the downstream communication partner 18, 12. In addition, in conjunction with the assignment of the address 22 provision can be made to transfer a response 26, for example in order to confirm that the address assignment has taken place and/or to deliver information to the effect that the assigned address is thus no longer available during the further course of automatic address assignment, to the primary communication partner 14.

FIG. 3 shows a schematic representation of a further embodiment of the method relating to automatic address allocation, which corresponds in its main features to that described in FIG. 2. With the assignment of the address 22 to the communication partner 12, the latter transfers a response 26, which henceforth additionally contains an attribute data item 28 of the communication partner 12, to the primary communication partner 14. Using the attribute data item 28, a topology of the network 10 is ascertained and this is evaluated by the primary communication partner 14 in order to perform an addressing of at least one telegram 30 to be transferred for example on the basis of this evaluation.

FIG. 4 shows a schematic representation of an alternative method relating to automatic address allocation to a communication partner 12 encompassed by the network 10. The primary communication partner 14 transfers the data item 16 to a communication partner, to which, other than in the case of the communication partners considered previously, a plurality of communication partners are connected and which is referred to in the following and in common usage, such as it is, as "hub" 32 for short, which transfers the data item 16 to the communication partners 12, 34 connected to it. In conjunction with the transfer of the data item 16, in other words before, during or after the transfer to the communication partners 34, 12, the data item 16 is modified by the hub 32. In this situation, a modification of the data item occurs for each port in the manner described above. In other words, in the case of a first port the data item is modified for the first time, in other words incremented or decremented. In the case of a second port, the data item modified in this way is modified again, in other words for example further incremented or decremented. Alternatively, a modification of the data item based on a data item originally received at the hub 32 also takes place in such a way that a one-off modification takes place for a first port, a modification is performed twice for a second port, etc. The communication partners 12, 34 perform a comparison of the data item 16 with the reference data item 20 and if the data item 16 is found to match the reference data item 20, the address 22 is assigned to the respective communication partner 12 for which the data item 16 matches the reference data item 20.

FIG. 5 shows a schematic representation of a communication partner 12 for use in a method as illustrated in FIGS. 2 to 4. The communication partner 12 is assigned a receiver facility 38 to receive the data item 16 (cf. FIGS. 2 to 4) and a comparator 40 to compare the data item 16 with the reference data item 20 (cf. FIGS. 2 to 4). Furthermore, the communication partner 12 comprises a processing unit 42 which is provided for assigning the address 22 (cf. FIGS. 2 to 4) to the communication partner 12 and for transferring the data item 16 to a sender facility 44 of the communication partner 12, depending in each case on the result of the comparison of the data item 16 with the reference data item 20. The processing unit 42 is moreover provided for modifying the data item 16, as described above, in conjunction with transferring it to the sender facility 44.

The network 10 represented in FIGS. 1 to 4 can be a network with automation devices as communication partners 12, 14, 18, 34 and accordingly forms an automation system or a part of an automation system which is provided in an already known manner for controlling and/or monitoring a technical process. In this respect the terms network 10 and automation system and communication partner 12, 14, 18, 34 and automation device are to be understood as synonymous.

The invention can thus be described in brief as follows:

The invention relates to a method for automatic address allocation to at least one communication partner 12, 18 encompassed by a network 10, whereby a primary communication partner 14 likewise encompassed by the network 10 transfers a data item 16 to the, or one of the, communication partner(s) 12, 18 and whereby the communication partner in question 12, 18 performs a comparison of the data item 16 with a reference data item 20. Depending on the result of the comparison, either an address 22 is assigned to the communication partner in question 18 or the data item 16 is transferred to a communication partner 12 downstream of the communication partner in question 18 in the network 10 and the data item 16 is modified in conjunction with the transfer of the data item 16 to the downstream communication partner 12. Moreover, the invention relates to a communication partner as well as an automation system for executing the method as well as an automation system with such a communication partner.

The invention claimed is:

1. A method for an automatic address allocation to at least one communication partner encompassed by a network, comprising:
    transferring a data item by a primary communication partner encompassed by the network to at least one further communication partner encompassed by the network;
    comparing the data item with a reference data item by the communication partner and generating a result; and
    either assigning an address to the communication partner or transferring the data item to a further communication partner, dependent on the result of the comparison, wherein the data item is modified if transferred.

2. The method as claimed in claim 1, wherein the primary communication partner transfers a data record comprising the data item and the address to the communication partner.

3. The method as claimed in claim 2, wherein the modification of the data item is based upon a decrementation with predefined step sizes.

4. The method as claimed in claim 3, wherein the decrementation is effected by the communication partner.

5. The method as claimed in claim 1, wherein the modification of the data item is based upon an incrementation with predefined step sizes, and wherein the modified data item is transmitted downstream.

6. The method as claimed in claim 3, wherein the incrementation is effected by the communication partner.

7. The method as claimed in claim 1, wherein if an address is assigned to the communication partner a response is transferred by the communication partner to a further communication partner for processing the transferred response.

8. The method as claimed in claim 7, wherein the further communication partner is the primary communication partner.

9. The method as claimed in claim 7, wherein at least one attribute data item assigned to the communication partner is transferred via the response.

10. The method as claimed in claim 9, wherein the attribute data is a topology data.

11. The method as claimed in claim 10, wherein the communication partner processing the response determines a topology of the network based on the topology data item.

12. The method as claimed in claim 11, wherein the primary communication partner determines the topology.

13. The method as claimed in claim 12, wherein an addressing of at least one telegram is based on the determined topology of the network.

14. A communication partner, comprising:
    a receiver facility to receive a data item;
    a comparator for comparing the data item with a reference data item;
    a sending device; and
    a processing unit to assign an address to the communication partner or to transfer the data item to the sending device for a transmission thereof to a further communication partner, wherein either the assignment or the transmission are selected based on the result of the comparison made by the comparator, and wherein the processing unit modifies the data item if transferred.

15. The communication partner as claimed in claim 14, wherein the processing unit increments or decrements the data item based on a predefined step size.

16. The communication partner as claimed in claim 14, wherein the processing unit transfers a response to the sending unit if the address is assigned.

17. The communication partner as claimed in claim 14, wherein the communication partner for incrementing or decrementing is a Hub.

18. An automation system, comprising:
    a primary communication partner with a processing unit to transfer a data record to a further communication partner, wherein the data record comprises a data item and an address;
    the further communication partner comprising:
        a receiver facility to receive the data record,
        a comparator for comparing the data item with a reference data item,
        a sending device, and
        a further processing unit to assign the address to the further communication partner or to transfer the data record to the sending device for a transmission to a third communication partner, wherein either the assignment or the transmission are selected based on the result of the comparison made by the comparator, and wherein the further processing unit modifies the data item if transferred.

\* \* \* \* \*